(12) United States Patent
Knoll

(10) Patent No.: US 9,416,498 B2
(45) Date of Patent: Aug. 16, 2016

(54) METHOD FOR PROFILING A LAID RAIL AND PROCESSING VEHICLE

(75) Inventor: Johann Knoll, Schörfling (AT)

(73) Assignee: Linsinger Maschinenbau Gesellschaft m.b.H. (AT)

( * ) Notice: Subject to any disclaimer, the term of this patent is extended or adjusted under 35 U.S.C. 154(b) by 345 days.

(21) Appl. No.: 13/884,434

(22) PCT Filed: Nov. 11, 2011

(86) PCT No.: PCT/AT2011/050028
§ 371 (c)(1),
(2), (4) Date: Aug. 20, 2013

(87) PCT Pub. No.: WO2012/061864
PCT Pub. Date: May 18, 2012

(65) Prior Publication Data
US 2013/0318762 A1    Dec. 5, 2013

(30) Foreign Application Priority Data

Nov. 11, 2010   (AT) ................. A 1854/2010

(51) Int. Cl.
| | |
|---|---|
| *E01B 31/12* | (2006.01) |
| *B23P 6/00* | (2006.01) |
| *B23Q 9/00* | (2006.01) |
| *B23Q 35/04* | (2006.01) |

(Continued)

(52) U.S. Cl.
CPC . *E01B 31/12* (2013.01); *B23C 1/20* (2013.01); *B23C 3/005* (2013.01); *B23C 2215/32* (2013.01);

(Continued)

(58) Field of Classification Search
CPC ...... B23C 3/005; B23C 2215/32; B23C 1/16; B23C 1/20; B23C 1/007; B23C 3/002; B23P 6/00; B24B 19/004; E01B 31/02; E01B 31/12; E01B 31/13; E01B 31/15; E01B 31/17; E01B 2203/012; Y10T 29/49618; Y10T 29/49748; Y10T 29/54; Y10T 29/49778; Y10T 409/306384; Y10T 409/30644; Y10T 409/306496; Y10T 409/301624; Y10T 409/303192; Y10T 409/30336; Y10T 409/30168; Y10T 409/301792; Y10T 409/301904; Y10T 409/302072; Y10T 409/303752; Y10T 409/303808; B23Q 9/0007; B23Q 9/0014; B23Q 9/0021; B23Q 9/0028; B23Q 9/0035; B23Q 9/02; B23Q 33/00; B23Q 35/04; B23Q 35/08; B23Q 35/10; B23Q 35/12–35/13; B23Q 2240/007
See application file for complete search history.

(56) References Cited

U.S. PATENT DOCUMENTS 4,365,918 A    12/1982   Theurer
(Continued)

FOREIGN PATENT DOCUMENTS

CN    1484723 A    3/2004
(Continued)

OTHER PUBLICATIONS

"Railroad Track Standards", Apr. 8, 1991, Departments of the Army and the Air Force, Army TM 5-628, Air Force AFR 91-44, pp. 7-1, 7-2, C-1, C-2, C-3.*

(Continued)

*Primary Examiner* — Ryan J Walters
*Assistant Examiner* — Matthew P Travers
(74) *Attorney, Agent, or Firm* — Lerner, David, Littenberg, Krumholz & Mentlik, LLP

(57) ABSTRACT

The invention relates to a method of profiling a running surface of a laid rail by means of a processing vehicle, in particular in the region of a switch, comprising placing a first copying probe element displaceable transversely to the rail in contact with the running edge or the inner side edge and machining the rail.

17 Claims, 5 Drawing Sheets

(51) Int. Cl.
E01B 31/13 (2006.01)
E01B 31/17 (2006.01)
B23C 1/20 (2006.01)
B23C 3/00 (2006.01)
B24B 19/00 (2006.01)

(52) U.S. Cl.
CPC ............... *B23P 6/00* (2013.01); *B23Q 9/0007* (2013.01); *B23Q 9/0014* (2013.01); *B23Q 35/04* (2013.01); *B24B 19/004* (2013.01); *E01B 31/13* (2013.01); *E01B 31/17* (2013.01); *Y10T 29/49618* (2015.01); *Y10T 29/49748* (2015.01); *Y10T 29/49778* (2015.01); *Y10T 29/5176* (2015.01); *Y10T 29/54* (2015.01); *Y10T 409/30336* (2015.01); *Y10T 409/30644* (2015.01); *Y10T 409/301624* (2015.01); *Y10T 409/303472* (2015.01); *Y10T 409/306384* (2015.01); *Y10T 409/306496* (2015.01)

(56) References Cited

U.S. PATENT DOCUMENTS

| | | | |
|---|---|---|---|
| 4,492,059 A * | 1/1985 | Panetti | 451/347 |
| 4,534,689 A | 8/1985 | Theurer | |
| 4,583,895 A | 4/1986 | Theurer | |
| 4,615,150 A * | 10/1986 | Panetti | 451/347 |
| 4,829,723 A * | 5/1989 | Bull et al. | 451/347 |
| 4,908,993 A | 3/1990 | Buhler | |
| 2003/0129926 A1 | 7/2003 | Knoll et al. | |

FOREIGN PATENT DOCUMENTS

| | | | |
|---|---|---|---|
| CN | 1723319 A | 1/2006 | |
| CN | 101481897 A | 7/2009 | |
| DE | 3015283 A1 | 7/1981 | |
| DE | 102005044786 A1 | 3/2007 | |
| EP | 0552473 A1 | 7/1993 | |
| FR | 2700562 A1 * | 7/1994 | ............... E01B 31/17 |
| GB | 2056345 A | 3/1981 | |
| JP | S56-028902 | 3/1981 | |
| JP | H01-280102 A | 11/1989 | |
| WO | 0206587 | 1/2002 | |

OTHER PUBLICATIONS

International Search Report for Application No. PCT/AT2011/050028 dated Mar. 19, 2012.

* cited by examiner

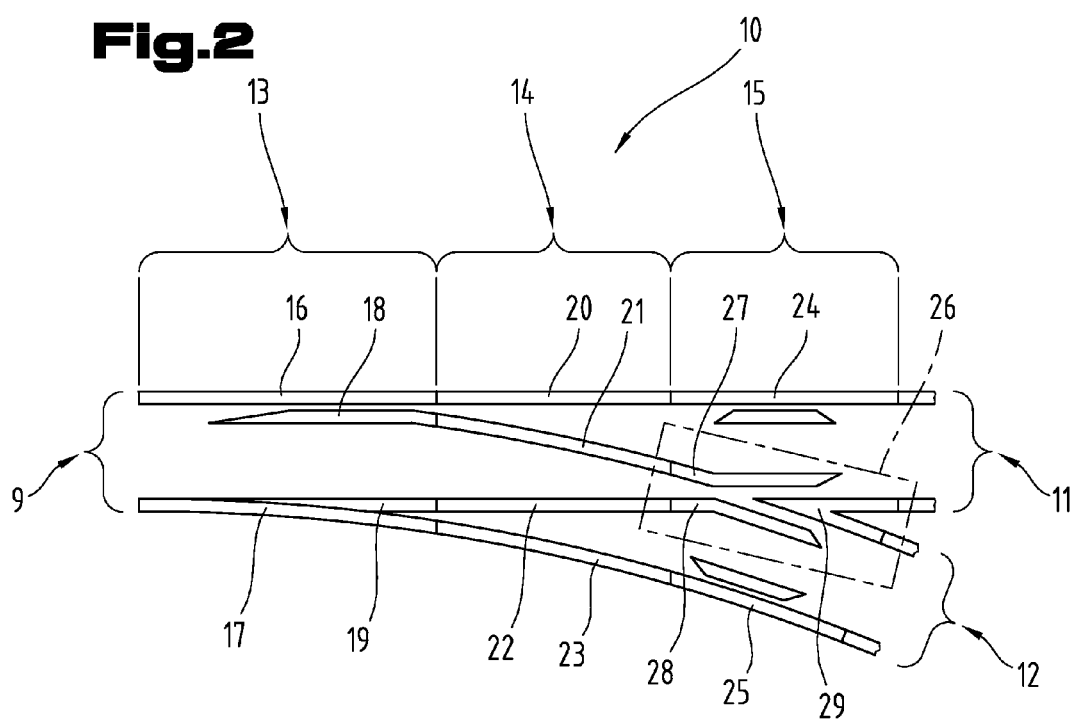
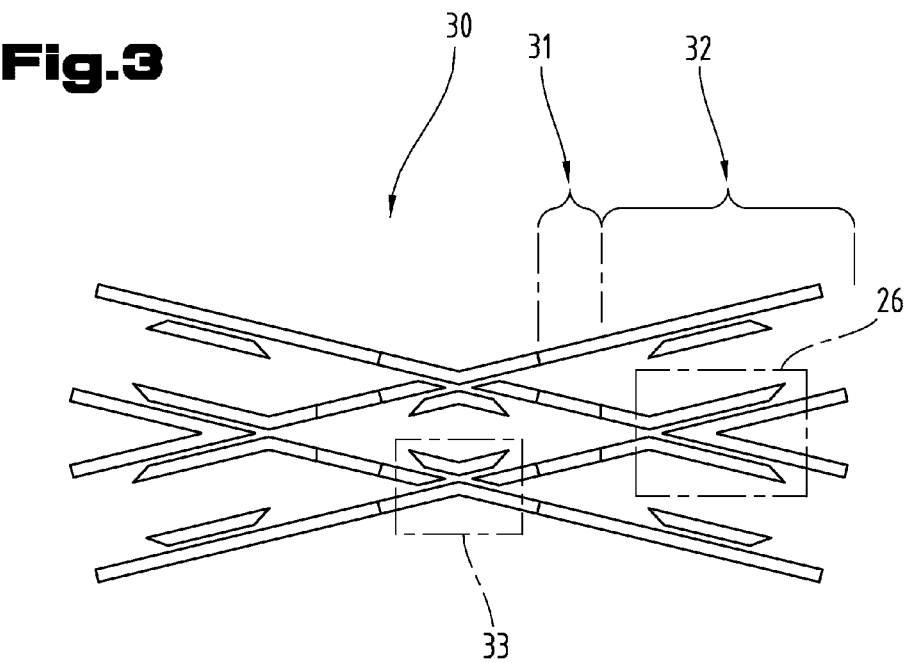

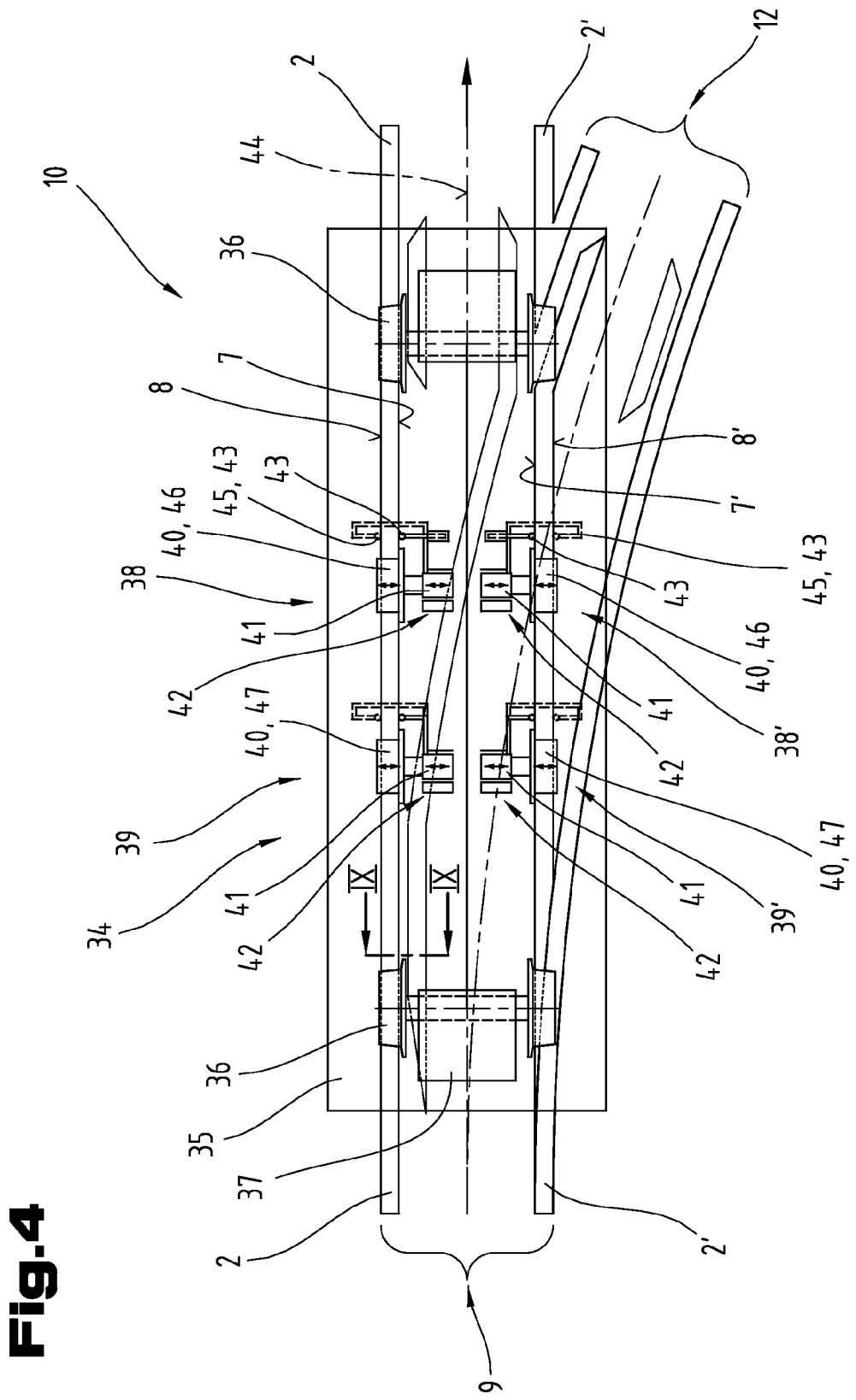

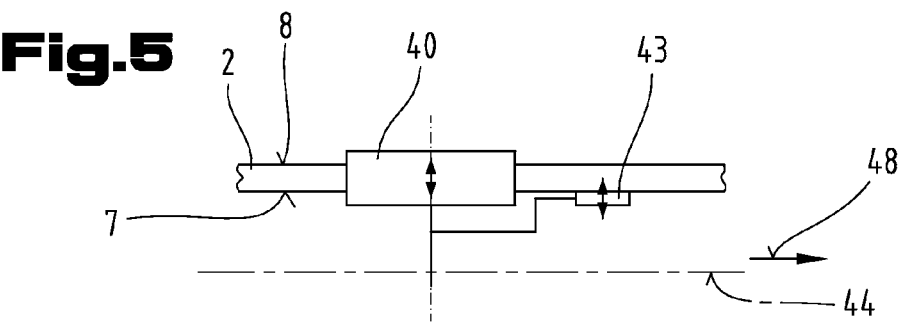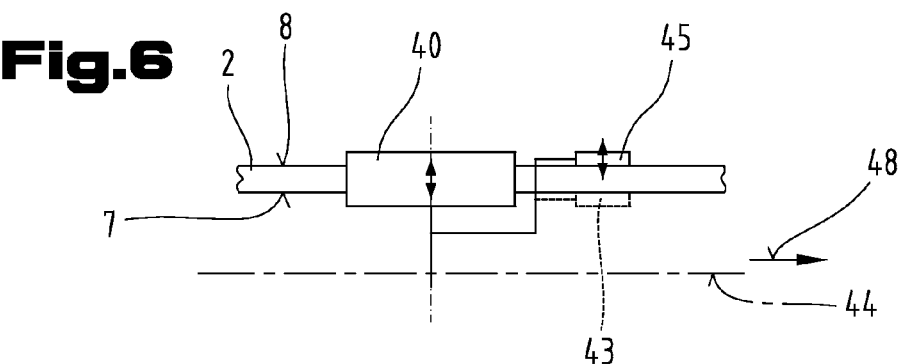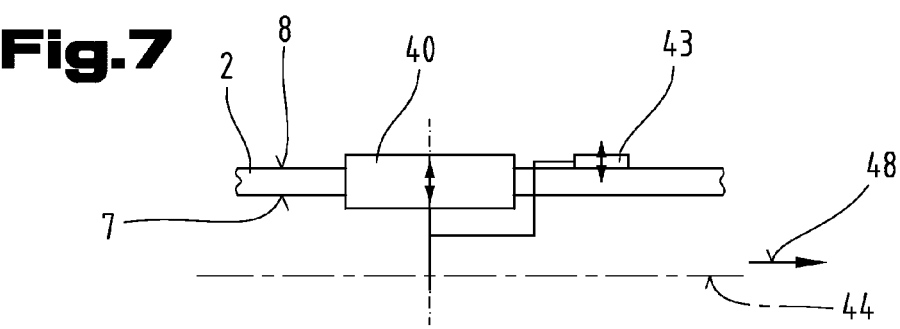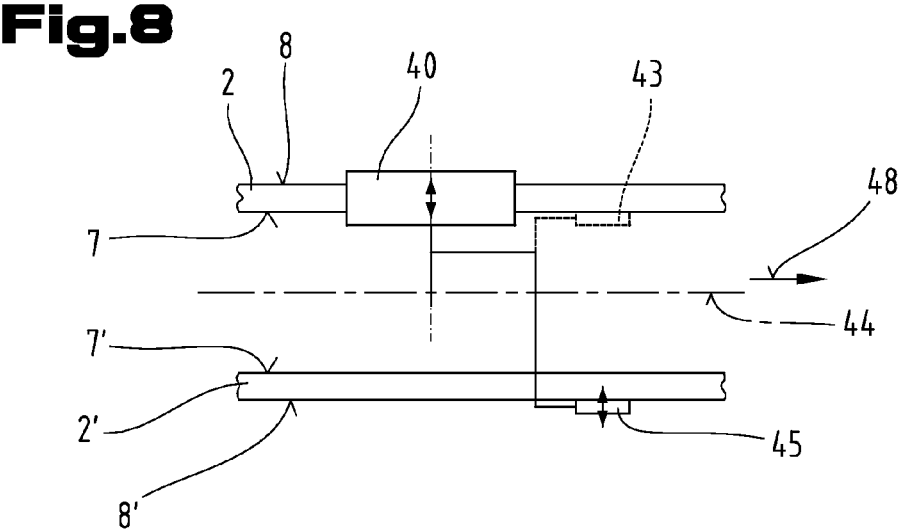

METHOD FOR PROFILING A LAID RAIL AND PROCESSING VEHICLE

BACKGROUND OF THE INVENTION

The invention relates to a method of profiling a track rail as well as a track-guided processing vehicle as defined in the claims.

BRIEF SUMMARY OF THE INVENTION

Rails laid in a track are naturally subject to wear, which is mainly caused by the contact forces acting between the rails and the wheels of the rail vehicles moved on them. The undesirable changes which occur in the rail cross-section are treated by a re-profiling method on a regular basis or as and when required in order to lengthen their service life. Re-profiling is primarily done using a machining process involving the removal of material, such as grinding, planing or milling, and these machining processes can be carried out either with the rails dismantled or in the laid track by means of track-guided processing vehicles.

One method of re-profiling a rail is known from WO 02/06587 A1, for example. It discloses a track-guided processing vehicle, by means of which the running surface of a rail essentially comprising the driving surface and the running edge is restored to the desired or approximately the desired profile by peripheral milling and if necessary by means of a grinding process. Although the desired profile of rails can be rapidly restored in a rational manner with such a method and such a processing vehicle, it has only been possible to use them on continuous sections of track in the past, whereas the re-profiling of track sections with interruptions, such as in the region of switches or crossings, is often done using hand-held processing tools or smaller special devices, which means that the re-profiling of tracks in the region of switches or crossings still results in longer shut-down times due to the high element of manual labor and thus longer-lasting disruption to railway traffic, running up correspondingly high costs as a result.

The objective of the invention is to propose a re-profiling method and a processing vehicle by means of which rational and defined re-profiling is possible within a short time, even in the region of switches or track crossings.

The objective of the invention is achieved by a method based on the characterizing features defined in the claims. Due to the inventive use of an additional, second, copying probe element, the possibility of moving the first copying probe element and the fact that the first and second copying probe elements have a maximum width of 35 mm, a conventional processing vehicle is able to machine a major part of rail sections where there are switches or crossings, thereby enabling the amount of manual and/or time-intensive mechanical machining needed for re-profiling rails in such track sections to be significantly reduced. Due to the second copying probe element and the fact of being able to move the first copying probe element, the running surface can be re-profiled even in rail sections in which a processing vehicle of the type known from the prior art provided with only a first copying probe element would not be able to continue machining, because the requisite guiding action and exact positioning of the processing tool or processing unit can now also be achieved in this situation. To a certain extent, the reference edge is switched for a more suitable reference edge, thereby enabling the processing operation to continue in spite of interruptions in the first reference edge.

It may be of advantage to implement a method as defined in the claims if other machining methods are better suited to the re-profiling work in specific part-sections of the track or rail, such as in the immediate vicinity of a frog or similar, or, for example, if welding work needs to be done prior to a machining operation to remove material. Given the fact that the machining tools have to be displaceable so that they can be disengaged from the rails in any case, no additional structural features are necessary for this purpose.

It is also of advantage to run a method of the type defined in the claims, because placing the first copying probe element in contact with the inner face of the rail to be machined in the area of a stock rail would not give the requisite machining accuracy because the running edge on the stock rail has a recess for accommodating the point blade.

The option of applying a position correction in the horizontal direction as defined in the claims also means that special cross-sections can be machined.

A method as implemented in the claims may advantageously be used as a means of maintaining a reference value for the positioning of the machining tool when travelling over the frog, thereby enabling the machining tool as well as the first copying probe element to be moved back into the engaged position on the rail by a less complex adjustment after the frog. The outer side of the rail parallel therewith is therefore also well suited as a reference edge because it is subject to only a negligible amount of wear.

The advantage of implementing the method defined in the claims is that the adjustable point blades can also be re-profiled during the course of a working trip. Having been raised in the defined manner, the point blade is preferably lowered back to the original level after re-profiling, although it would also be possible for lowering to be only partially effected after machining.

A high-performance material removal and hence short machining time is achieved as a result of the method defined in the claims.

Using the method defined in the claims enables high accuracy to be obtained on the finished, machined profile, which is of particular advantage where requirements for quiet running are high. The grinding process defined in the claims may also be performed after a re-profiling operation as defined in the claims, and in particular can be carried out by a processing vehicle in one and the same working trip, which also enables the machining time needed for re-profiling a rail track in the region of switches and track crossings to be reduced.

The objective of the invention is also achieved by means of a rail-guided processing vehicle as defined in the claims, such a processing vehicle being suitable for implement the re-profiling method proposed by the invention and thus also suitable for a rational machining operation on rail surfaces or rail running surfaces in the region of switches and track crossings.

The processing vehicle proposed by the invention is preferably designed to have a maximum width of 35 mm for the first and second copying probe elements because this more or less corresponds to the maximum wheel flange thickness which must not be obstructed by any track fittings and which is a requirement on normal tracks everywhere.

A design for the processing vehicle as defined in the claims is of advantage because in the case of redeployment journeys or when travelling on tracks which deviate from the standard profile, collisions of the copying probe elements with stationary obstructions can be avoided. The distance from the rail is therefore preferably at least 100 mm, preferably in the vertical direction.

The design of the processing vehicle defined in the claims enables rails to be re-profiled by removing material using a milling process, and using a milling process enables a relatively thick amount of material to be removed compared with grinding, thereby obviating the need for multiple grinding operations and trips along the same section of rail. The design of the milling tool as a peripheral milling cutter enables particularly high performance to be obtained in terms of removing material and the peripheral milling cutter may be equipped with indexable inserts, for example, which are easily interchangeable.

In order to obtain high accuracies in the finished, machined rail profile, it is of advantage, if the processing vehicle is of the type defined in the claims, to use a machining tool in the form of a grinding tool, in which case an embodiment in the form of a peripheral grinding disk enables good performance in terms of material removal.

As defined in the claims, the grinding tool and the associated machining unit may be provided in addition to a milling tool and associated machining unit, in which case it is disposed after the milling tool as viewed in the working direction of the processing vehicle and removes any profile deviations which might still exist after the milling operation, such as corrugation which occurs due to the limited number of blades of a milling tool. The machining units disposed one after the other in the direction of travel therefore comprise respectively a copying probe element, the contact position of which can be varied or changed, or a second copying probe element is provided by means of which the contact position can be changed.

As defined in the claims, in addition to a milling tool and/or a grinding tool, a machining unit may have a machining tool in the form of a flap disk, which enables a further improvement in the surface quality of the re-profiled rail to be obtained because its offer higher flexibility than a rigid grinding disk, thereby enabling a further improved surface quality to be achieved.

In order to improve the work performance of a processing vehicle proposed by the invention and as defined in the claims 15, machining tools are disposed on either side of a vertical longitudinal mid-plane of the processing vehicle and can be moved into engagement with both rails of a rail track simultaneously. Accordingly, both rails can be fully re-profiled in one work trip, including in the region of a switch or a track crossing.

As defined in the claims, the machining units can preferably be adjusted by means of CNC-controlled shafts, thereby making it easier to obtain an exact positioning of the machining tools. To this end, the shafts have suitable displacement drives, such as servo-motors, for example. The displacement is obtained by appropriate guides, at least in the vertical direction, to enable the machining tools to be moved into engagement and out of engagement with a rail, although it would also be possible to make provision for an additional displacement in the horizontal direction transversely to the rail longitudinal direction, in which case a coupling is provided between the copying probe element and machining tool via the control system. The horizontal displacement is preferably obtained by means of a horizontal guide and a mechanical coupling of the machining unit to the respective copying probe element.

An embodiment as defined in the claims is of advantage because the processing vehicle has its own drive motor and is not dependent on a towing vehicle and therefore lends itself to universal use.

The invention further relates to the use of the method proposed by the invention and the processing vehicle proposed by the invention for re-profiling laid rails within a switch or a track crossing, and in particular rail sections selected from a group comprising stock rails, point blades, crossover rails, closure rails and continuously extending check rails can be rationally processed.

To provide a clearer understanding, the invention will be described in more detail below with reference to the appended drawings.

BRIEF DESCRIPTION OF THE DRAWINGS

These are highly schematically simplified diagrams, illustrating the following:

FIG. 2 is a plan view of a single switch with rail sections which can be machined;

FIG. 3 is a plan view of a track crossing with rail sections which can be machined;

FIG. 4 is a plan view of a processing vehicle proposed by the invention in the process of re-profiling within a switch;

FIG. 5 illustrates re-profiling based on inner copying by means of a first copying probe element;

FIG. 6 illustrates re-profiling based on outer copying by means of a second copying probe element;

FIG. 7 illustrates re-profiling based in outer copying by means of an adjusted first copying probe element;

FIG. 8 illustrates re-profiling based on outer copying by means of a second copying probe element on the parallel rail;

DETAILED DESCRIPTION

Figure 1:
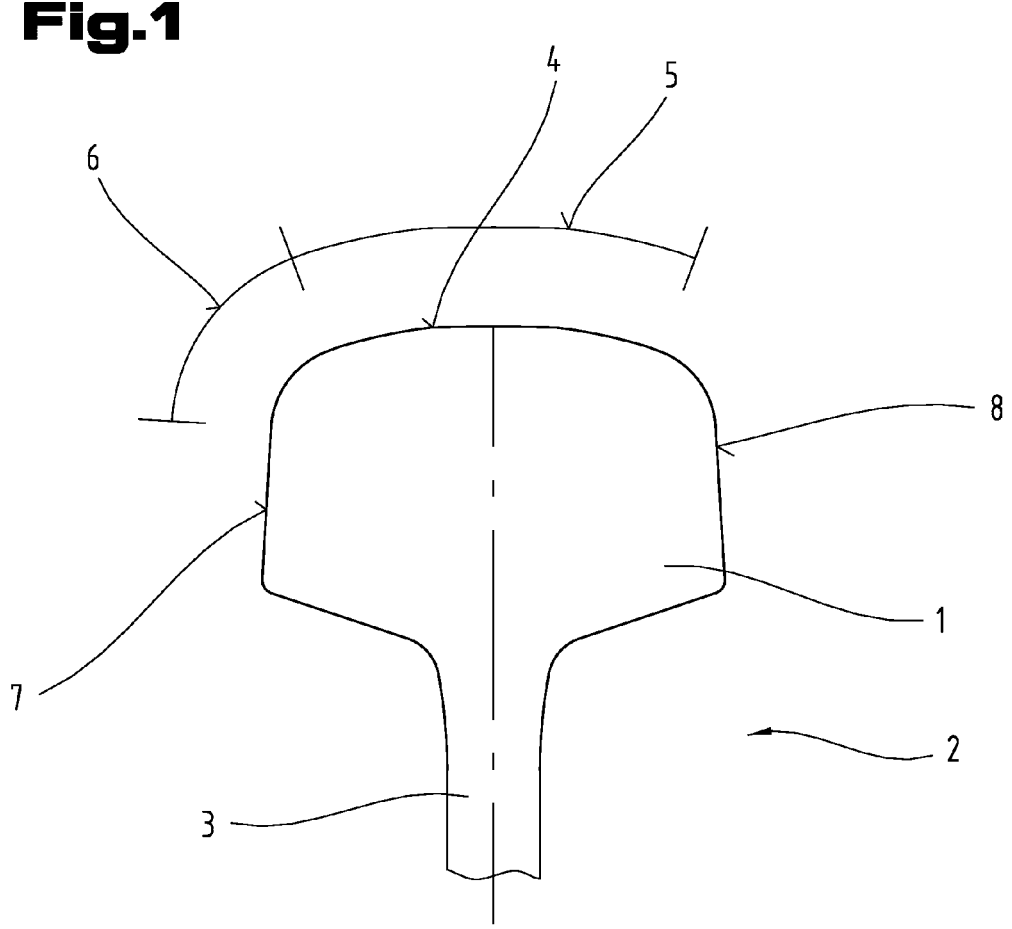
FIG. 1 is a cross-section through a rail head.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 is a cross-section illustrating the profile of a rail head 1 of a rail 2, the rail head 1 being supported by a rail web 3 and secured to a sleeper or some other bearing and the ground underneath by means of a rail foot, although this is not illustrated. The part of the rail head 1 with which wheels of a rail vehicle can come into contact is referred to as the running surface 4 in this connection, and generally comprises the driving surface 5 on the top face of the rail head 1 and the running edge 6 constituting the transition to the inner side face 7 facing the track center. Over time, the running surface 4 of laid rails 2 becomes damaged, for example by corrosion, wear, tears, driving surface defects such as striations, corrugation, damage caused by skidding wheels, pitting, changes in the cross-sectional profile such as flattening of the cambered driving surface, scratches, beading, etc. Damage restricted to the outermost region of the running surface 4 can be eliminated for the most part by re-profiling the rail 2, whereby a machining process involving the removal of material removes the worn or damaged rail profile from the surface of the rail 2, restoring the machined rail head 1 as far as possible to a state close to a desired profile.

The method proposed by the invention relates to the profiling or re-profiling of the running surface 4, and this machining work to remove material may also extend beyond the running edge 6 and across the inner side face 7 and possibly also beyond the driving surface 5 and across the outer side face 8.

FIG. 2 is a simplified plan view illustrating a track 9 with a switch 10, having a main track 11 running through the switch 10 in a straight line and a branch line 12 branching off to the right. The switch 10 comprises the points region 13, the region between the tracks 14 and the frog region 15. Using the method proposed by the invention and a processing vehicle proposed by the invention, it is possible to profile or re-profile the following individual parts or rail sections of the switch 10: straight left-hand stock rail 16, curved right-hand stock rail 17, curved left-hand point 18, straight right-hand point 19, straight left-hand crossover rail 20, curved left-hand crossover rail 21, straight right-hand crossover rail 22, curved right-hand crossover rail 23, straight left-hand check rail 24, curved right-hand check rail 25. The area in the immediate vicinity of the frog 26 is not machined, in other words the left-hand wing rail 27, the right-hand wing rail 28 and the frog point 29.

In the case of a switch 10 based on a left-hand design, the rail sections listed above are laid out in mirror image and can also be re-profiled using the method proposed by the invention.

FIG. 3 is a simplified plan view of a track crossing 30 having similar components to a switch 10 and on which the following rail sections or individual parts can be re-profiled using the method proposed by the invention and a processing vehicle proposed by the invention: the rail sections in the region between the tracks 31 as well as the outer continuously extending check rails in the frog region 32. In this instance, the wing rails and the frog point in the frog region 32 and the area in the immediate vicinity of the double frog 33 with the associated joggled rails and check rails are not processed.

The function of the listed rail sections and individual parts and how they co-operate with the wheels of a railway vehicle will not be described here as the skilled person is familiar with these aspects.

FIG. 4 is a schematically simplified plan view illustrating a processing vehicle 34 implementing the method proposed by the invention for profiling or re-profiling the rail tracks within a switch 10. The processing vehicle 34 comprises a vehicle frame 35 which may be a box-type or ladder-type frame, for example, or based on some other design. The vehicle frame 35 is supported on the rails 2 and 2' by two sets of wheels 36, for example, although it would naturally also be possible to provide more than two sets of wheels 36 and these may also be mounted at points of rotation which can be moved relative to the vehicle frame 35. By providing an optional drive motor 37 which acts on at least one set of wheels 36, the processing vehicle 34 may also be of a self-propelled design.

In order to process the rails 2, 2', the processing vehicle 34 has at least one machining unit 38, and in the embodiment illustrated as an example here, another three machining units 38', 39 and 39' are illustrated, and in this respect it is preferable to assign the machining units 38, 39 and 38', 39' disposed one after the other in direction of travel to the rails 2 and 2'.

Every machining unit 38, 38', 39, 39' has a machining tool 40 for removing material, which can be moved into engagement with the rail 2, 2' to be machined and is connected drive device 41 imparting a rotating motion, preferably in the form of a driving motor. The machining tool is able to remove material by means of geometrically defined cuts or non-geometrically defined cuts. The machining tool 40 and the entire machining unit 38, 39, 38', 39' can be displaced relative to the vehicle frame 35 by means of a displacement arrangement 42, as a result of which the machining tool 40 can also be displaced relative to the rail 2, 2' to be machined and in this sway, the profile of the machined surface of the rail 2 created by the machining tool 40 is fixed on the basis of its position with respect to the rail cross-section in the vertical and horizontal direction relative to the rail longitudinal direction.

To this end, the displacement arrangement has guides which enable the machining tool 40 to be displaced at least in the horizontal direction transversely to the rail longitudinal direction and in order to position the machining tool 40 exactly, it is coupled with a first contact element 43 which can be moved into contact with the running edge 6 or the inner side face 7 of the rail 2 to be machined. During re-profiling of the rail profile removing material by means of the machining tool 40, the processing vehicle 34 moves along the track 9 and the first contact element 43 is guided along the running edge 6 or inner side face 7, thereby also determining the horizontal position of the machining tool 40 coupled with it. Using the running edge 6 and/or inner side face 7 in this way as a reference surface for positioning the machining tool 40 is also referred to as inner copying and is known from the prior art.

The machining tool 40 or the entire machining unit 38, can also be displaced by means of the displacement arrangement in the vertical direction as well, as a result of which the machining tool 40 can be moved into engagement and out of engagement with the rail 2. In the same way as the machining tool 40 is positioned horizontally, it can also be positioned vertically by means of copying probe elements, although these are not illustrated in FIG. 4. One way of coupling the first copying probe element 43 with the co-operating machining tool 40 is by mechanical means, in which case, for example, the copying probe element 43 is disposed on a jib fixedly mounted on the machining unit 39 and the machining unit 39, which is displaceable in the horizontal direction transversely to the longitudinal direction of the rail 2, is pushed in the direction towards the inner side face 7 of the rail until the first copying probe element 43 lies against the running edge 6 or inner side face 7 of the rail 2 to be machined. In the case of a curved rail 2, where its distance from the longitudinal mid-plane 44 changes for example, the machining tool 40 is guided by the same amount in the horizontal direction so that the amount of material removed remains uniform as the rail 2 is being machined.

As an alternative to the mechanical coupling of the copying probe element 43 and machining tool 40 described above, it is also possible to provide a coupling by means of a position controller, in which case the copying probe element 43 is used as a measuring probe and the machining tool 40 is displaced in a tracking movement by means of a positioning drive on the basis of the path of the reference surface—more or less the inner side face 7—measured from the horizontal, transversely to the rail longitudinal direction.

This operation of machining rail tracks on conventional track sections has long been used with success but the processing vehicles known from the prior art have not been able to carry out machining work in the region of switches 10 or track crossings 30 because the rails used here have special cross-sectional shapes, such as stock rails or points rails, for example, which do not permit exact positioning of the machining tool 40 using conventional copying probe elements.

As proposed by the invention, the machining tool 40 may be coupled with a second copying probe element 45 which can be placed in contact with the outer side face 8 of the rail 2 to be machined. This additional second copying probe element 45 enables the copying probe function of the first copying probe element 43 on the inner side face 7 of a rail 2 to be deactivated in specific sections of the rail 2 and replaced by placing the second copying probe element 45 in contact with the outer side face 8 of a rail 2, which in this connection may be termed outer copying.

The switchover from inner copying to outer copying preferably takes place seamlessly, i.e. the coupling of the machining tool 40 with the inner first copying probe element 43 is firstly released when the coupling is used on the outer, second copying probe element 45. This changeover can be effected whilst the processing vehicle 34 is moving but also during a brief stoppage.

FIG. 4 shows the processing vehicle 34 in a position in which the first machining unit 38 is disposed in the region of the straight left-hand crossover rail 20 (see FIG. 2) and the horizontal positioning of the machining tool 40 by inner copying is effected by means of the first copying probe element 43. In the region of the stock rail 16 (see FIG. 2), horizontal positioning of the machining tool 40 takes place on the basis of a coupling with the second copying probe element 45 because in this section of the rail 2, the stock rail 16 has a recess on the inner side face 7 for accommodating the point blade 18 and there is therefore no reference surface suitable for inner copying.

In the same way, the right-hand machining unit 38' in the region of the curved, right-hand stock rail 17 (see FIG. 2) is temporarily switched from inner copying to outer copying.

In the case of the two rear machining units 39 for the left-hand rail 2 and 39' for the right-hand rail 2', a switchover is also made from inner copying to outer copying in the region of the stock rails 16 and 17.

In the case of a processing vehicle 34 proposed by the invention with at least two machining units 38, 39 disposed one after the other in the direction of travel, the front machining unit 38 is preferably provided in the form of a milling unit, in which case the machining tool 40 is a milling tool 46. In particular, such a milling tool 46 may be a peripheral milling cutter, which is provided with blades on its outer periphery, which are advantageously provided in the form of interchangeable indexable inserts. A milling tool 46 used is able to approximate the profile of the rail head 4 to be obtained by using indexable inserts with straight cutting edges, for example, thereby creating a polygonal contour approximating the desired profile from straight blade sections. In addition or as an alternative, it would also be possible to provide indexable inserts with curved blades, by means of which, in particular, the transition from the driving surface 5 to the side faces 7 and 8, especially the running edge 6, can be machined. The procurement and maintenance of such a milling tool 46 is therefore essentially based on an inexpensive interchange of indexable inserts which is rapidly implemented.

The rear machining units 39, 39' are preferably provided in the form of grinding units, having machining tools 40 in the form of grinding tools 47. The grinding tools 47 may be activated in addition to or as an alternative to the milling tools 46 and a very high surface quality is obtained by grinding the rail sections to be machined. In particular, mill cutting followed by grinding represents an optimum combination of in terms of processing because a major part of the work of removing material can be done by the milling operation in one working trip, in other words in a short time and, during the same working trip, the profile which has already been milled to a good approximation of the desired profile can be even better approximated to the desired profile by a single grinding operation, and a very high surface quality of the fully machined rails 2, 2' can also be achieved in the region of switches 10 and track crossings 30 within a short time.

As illustrated in FIG. 4, the grinding tools 47 are configured with an approximately horizontal axis of rotation. It is also possible to use pot-shaped grinding tools with an approximately vertical axis of rotation. The grinding tools 47 may also be provided in the form of grinding belts or grinding stones. In the case of all the listed embodiments of grinding tools 47, they may be disposed so that the relative movement of the grinding tool 47 with respect to the rail longitudinal direction is effected obliquely at a slight angle, thereby achieving a good grinding result.

In addition, the two described variants of the coupling between the copying probe element 43, 45 and machining tool 40 can also be moved horizontally and/or vertically relative to the probed reference surface in order to influence or correct how material is removed.

FIG. 5 provides a schematic illustration of the technique of inner copying known from the prior art, whereby a first copying probe element 43 is placed in contact with the inner side face 7 of a rail 2 to be machined and is coupled with the machining tool 40 in the horizontal direction transversely to the rail longitudinal direction. For the sake of simplicity, only the left-hand machining tool 40 is illustrated by reference to the direction of travel 48, which may also be described as the working direction, and relative to the longitudinal mid-plane 44, and the copying probe element 43 coupled with it. This inner copying technique is used on all rail sections where there is a normal rail profile, in other words not in the region of stock rails, point blades and frogs.

FIG. 6 illustrates the switchover from inner copying to outer copying proposed by the invention, whereby the machining tool 40 is coupled with a second copying probe element 45 placed in contact with the outer side face 8 and uncoupled from the first copying probe element 43. The uncoupled state is indicated by the dotted lines of the uncoupled copying probe element 43.

The coupling of the machining tool 40 with copying probe elements 43, 45 is indicated by identical double arrows, transversely to the rail longitudinal direction.

This outer copying takes place in rail sections in which the inner side face 7 or running edge 6 is not suitable for use as a reference surface, for example in the region of a point recess of a stock rail 16, 17 (see FIG. 2).

FIG. 7 illustrates an alternative embodiment of the switchover from inner copying to outer copying, in which the first copying probe element 43 illustrated in FIG. 5 is moved as illustrated in FIG. 7 to the outer side face 8 of the rail 2 to be machined and placed in contact with it. For this movement, the coupling between the copying probe element 43 and the machining tool 40 is temporarily released. If the movement of the processing vehicle 34 is stopped in order to make this switchover and an inadvertent horizontal displacement of the machining tool 40 is blocked by appropriate means, a seamless transition can be effected between the inner side face 7 and the outer side face 8 constituting a reference surface for the horizontal positioning of the machining tool 40. As was the case with FIG. 6, this embodiment of outer copying may also be used for stock rails 16, 17.

Another embodiment of the method proposed by the invention is illustrated in FIG. 8, whereby the machining tool is coupled with a second copying probe element 45 which is placed in contact with the parallel rail 2', preferably with its outer side face 8'. The first copying probe element 43 is uncoupled from the machining tool 40 again in this phase. In particular, uncoupling may also involve raising the copying probe element 43 respectively 45, thereby enabling collisions with any track components to be avoided.

As an alternative to the diagram illustrated in FIG. 8, the second copying probe element 45 may also be placed in contact with the inner side face 7' of the parallel rail 2', and can be so regardless of which of the two side faces 7', 8' is better suited as a reference surface. Generally speaking, the outer side face 8' of the parallel rail 2 is better suited because it is subject to less wear and has less damage.

As proposed by the invention, this copying of the parallel rail 2' illustrated in FIG. 8 is used for machining rails 2 within switches 10 or track crossings 30 where both the inner side face 7 and the outer side face 8 of the rail 2 to be machined is not suitable for positioning the machining tool 40 horizontally, for example in the region of the frog 26, 33, because the rail track has interruptions here and there are therefore no suitable reference surfaces. Even though the method proposed by the invention does not involve any direct machining of the frog 26 to remove material, it is of advantage to position the machining tool 40 horizontally in this area because it is already in the correct horizontal position immediately after the frog 26 and can be moved back into engagement with the rail 2 to be machined.

It is necessary for the machining tool 40 to be guided by means of a copying probe element 43 respectively 45 because, due to the tolerances needed in the track width of the rails 2, 2' in conjunction with the wheel spacing transversely to the rail longitudinal direction, the movement of the processing vehicle 34 cannot be exactly guided by the latter and instead, what is referred to as hunting oscillation generally comes into play, caused by the slightly conical wheels of a railway vehicle and a slightly wave-shaped swaying motion of the railway vehicle 34.

In the immediate vicinity of the frog 26, 33, the machining tool 40 is moved in the vertical direction out of engagement with the rail 2 by means of the displacement arrangement 42 or a positioning drive, for example in the form of CNC-shafts, and whilst no machining takes place in the region of the frog 26, 33, the horizontal position of the machining tool 40 is determined by the second rail 2'.

Figure 9:
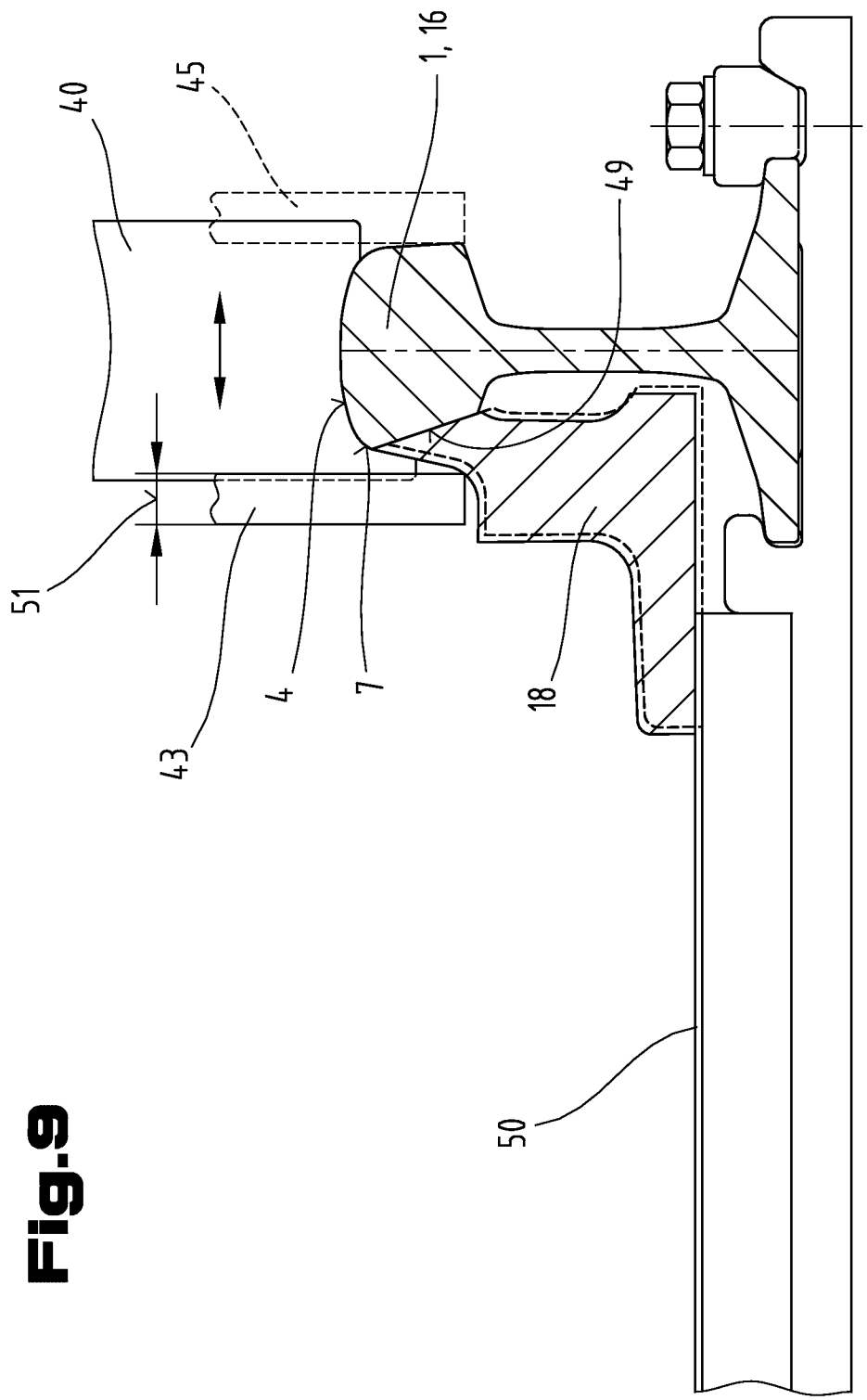
FIG. 9 illustrates re-profiling in the region of a point blade.

FIG. 9 is a section along line IX-IX indicated in FIG. 4, illustrating re-profiling of a driving surface 4 at a branch to a branch line 12 illustrated in FIG. 2. The left-hand rail 2 in this region is made up of the left-hand straight stock rail 16 and the left-hand curved point blade 18 and the switch is positioned so that the left-hand, curved point blade 18 lies against the left-hand straight stock rail 16, as a result of which the processing vehicle 39 is guided on the branch line 12 by the flanges of the wheels. The horizontal positioning of the machining tool 40 therefore takes place by means of a first copying probe element 43, which lies against the inner side face 7 of the point blade 18.

During re-profiling of the main track 11, in other words with the point blade 18 out of the way, the running surface 4 is only re-profiled on the straight left-hand stock rail 16, and the point recess 49 on the inner side face 7 of the stock rail 16 interrupts the reference surface for inner copying, as a result of which, as indicated by broken lines, a switchover is made to outer copying in this situation, either by means of a second copying probe element 45 on the outer side face 8 of the stock rail 16 or by moving the first copying probe element 43 to this side face 8.

Before re-profiling the point blade 18 respectively 19, the latter is advantageously raised more or less to the level of the driving surface 4 of the associated stock rail 16, 17, as a result of which the more pronounced wear of the point blades 18, 19 is compensated, imparting a new profile to them.

As viewed in the rail longitudinal direction, the second copying probe element 45 is preferably disposed at approximately the same position as the first copying probe element 43, and the first copying probe element 43 maintains its position in the rail longitudinal direction as it is moved from the inner side face 7 to the outer side face 8.

The solid lines in FIG. 9 illustrate the raised level of the point blade 18, whilst the broken lines indicate the original, lower level. This raising of the level of the driving surface 4 of the point blade 18 may be achieved by providing it with a bed 50 in the points region 13, for example, the thickness of which increases in the direction towards the blade tip. In the horizontal direction transversely to the rail 2, the copying probe elements 43, 45 have a width 51, which is at most mm, so that they are slimmer than the maximum permissible width or thickness of a wheel flange, thereby avoiding collisions with track fittings of any type.

The embodiments illustrated as examples represent possible variants of the method and the processing vehicle 34 proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and may be protected separately, possibly on the basis of divisional applications.

For the sake of good order, finally, it should be pointed out that, in order to provide a clearer understanding of the structure of the processing vehicle 34, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 4; 5, 6, 7, 8, 9 constitute independent solutions proposed by the invention in their own right. The objectives and associated solutions proposed by the invention may be found in the detailed descriptions of these drawings.

The invention claimed is:

1. A method of profiling a running surface comprising at least a running edge and a driving surface of a rail laid in a track, comprising driving on a track with a processing vehicle, laterally moving into contact with the running edge or an inner side face of the rail to be machined facing the track center with at least a first copying probe element mounted on the processing vehicle and displaceable in the horizontal direction transversely to the rail and machining the running edge or the driving surface of the rail with a machining unit having a machining tool driven in rotation for removing material which is displaceable and coupled with the first copying probe element at least in the horizontal direction, wherein during use of the processing vehicle in the region of a switch or a track crossing in specific part-sections of the track, either
  1) a second copying probe element is temporarily placed in contact with
     a) the outer side face of the rail to be machined; or
     b) a side face of the rail of the driven-over track parallel therewith;

and in these part-sections, the machining tool is, in the horizontal direction, coupled with the second copying probe element, and the coupling between the first copying probe element and machining tool is simultaneously deactivated, or;

2) after displacing the first copying probe element it is placed in contact with the outer side face of the rail to be machined;

and in these part-sections, the machining tool is, in the horizontal direction, coupled with the displaced first copying probe element; and copying probe elements with a width in the horizontal direction transversely to the rail of at most 35 mm are used.

2. The method according to claim 1, wherein in the immediate vicinity of a frog, the machining tool is moved out of engagement with the rail to be profiled.

3. The method according to claim 2, wherein in order to machine a frog region in the immediate vicinity of the frog, the second copying probe element is temporarily placed in contact with the outer side face of the rail parallel therewith and coupled with the machining tool, and the machining tool as well as the first copying probe element are moved out of contacting engagement with the rail.

4. The method according to claim 1, wherein in order to machine a stock rail section the second copying probe element or the first copying probe element is temporarily placed in contact with the outer side face of the stock rail to be machined and coupled with the machining tool.

5. The method according to claim 1, wherein in order to machine a stock rail section, the second copying probe element is temporarily placed in contact with the outer side face of the rail parallel therewith and coupled with the machining tool.

6. The method according claim 1, wherein a point blade which is driven over and has to be machined is placed in contact with the stock rail and the driving surface of the point blade is raised to the level of the driving surface of the stock rail by means of a bed, prior to machining.

7. The method according to claim 1, wherein the profiling comprises a milling operation.

8. The method according to claim 1, wherein the profiling comprises a grinding operation in the same work operation.

9. A rail-guided processing vehicle for profiling a running surface comprising at least the running edge and the driving surface of a rail laid in a track, comprising a vehicle frame, a first copying probe element mounted so as to be displaceable relative to the vehicle frame at least in the horizontal direction transversely to the rail and placed in contact with the rail for laterally contacting a running edge on the inner side face of the rail to be machined, at least one machining unit disposed on the vehicle frame having a machining tool for removing material, a drive device driving the machining tool in rotation, a displacement arrangement for displacing the machining tool or the machining unit relative to the vehicle frame, and the machining tool can be coupled with the first copying probe element at least in the horizontal direction, and 1) a second copying probe element is provided which can be displaced on to the outer side face of the rail to be machined or a side face of the rail parallel therewith and can be coupled with the machining tool, or 2) the first copying probe element can be displaced as far as the outer side face of the rail to be machined, wherein the copying probe elements have a width in the horizontal direction transversely to the rail of at most 35 mm, as a result of which profiling can be performed in the region of a switch or a track crossing.

10. The processing vehicle according to claim 9, wherein the copying probe elements can be displaced completely out of the immediate vicinity of the respective rail with which each probe element is associated.

11. The processing vehicle according to claim 9, wherein at least one machining tool is provided in the form of a milling tool.

12. The processing vehicle according to claim 9, wherein at least one machining tool is provided in the form of a grinding tool.

13. The processing vehicle according to claim 12, wherein one machining unit has a machining tool in the form of a flap disk.

14. The processing vehicle according to claim 9, wherein at least two machining units are disposed one after the other in the direction of travel, each being assigned first and second copying probe elements, and the front machining unit has a milling tool and the rear machining unit has a grinding tool.

15. The processing vehicle according to claim 9, wherein the machining tools are disposed on either side of a vertical longitudinal mid-plane of the processing vehicle and can be placed in engagement with both rails of a rail track simultaneously.

16. The processing vehicle according to claim 9, wherein the machining units can be displaced by means of CNC-controlled shafts.

17. The processing vehicle according to claims 9, wherein the processing vehicle has a drive motor.

* * * * *